United States Patent

Hayashida

Patent Number: 5,127,516
Date of Patent: Jul. 7, 1992

[54] CONVEYOR HAVING GROOVED CONVEYOR RAILS

[75] Inventor: Masayuki Hayashida, Kanagawa, Japan

[73] Assignee: Tokico Ltd., Kanagawa, Japan

[21] Appl. No.: 643,947

[22] Filed: Jan. 22, 1991

[30] Foreign Application Priority Data

Jan. 20, 1990 [JP] Japan ................... 2-11211

[51] Int. Cl.⁵ .................................................. B65G 21/20
[52] U.S. Cl. ..................... 198/836.1; 198/837; 198/841; 198/861.1
[58] Field of Search ............ 198/812, 837, 840, 841, 198/860.1, 860.3, 861.1, 836.1, 836.3, 836.4

[56] References Cited

U.S. PATENT DOCUMENTS

| | | | |
|---|---|---|---|
| 3,605,994 | 9/1971 | Parlette | 198/841 X |
| 3,800,938 | 4/1974 | Stone | 198/841 |
| 3,825,108 | 7/1974 | Stone | 198/861.1 |
| 4,951,809 | 8/1990 | Boothe et al. | 198/861.1 X |
| 4,993,541 | 2/1991 | Roh | 198/781 |
| 4,993,542 | 2/1991 | Nomura | 198/841 X |
| 5,009,306 | 4/1991 | Roderick et al. | 198/841 X |

Primary Examiner—D. Glenn Dayoan
Assistant Examiner—Tuan N. Nguyen
Attorney, Agent, or Firm—Wenderoth, Lind & Ponack

[57] ABSTRACT

A conveyor has a pair of conveyor rails and a conveyor belt supported on and guided by the conveyor rails. At least one of the conveyor rails includes an upper surface and opposite side surfaces. The at least one conveyor rail further includes a guide portion for guiding an outer side edge and the lower surface of at least a work conveying portion of the conveyor belt on which workpieces are supported to be conveyed. The upper surface and at least one of the side surfaces of at least one conveyor rail are provided with respective longitudinal T-grooves formed therein, extending along the length of the conveyor rail and having a cross section resembling the letter T. The conveyor further includes fastening members respectively slidably placed in the T-grooves, a side rail fastened to the upper surface of at least one conveyor rail by the fastening members so as to guide the upper surface of the work conveying portion of the conveyor belt near the outer side edge thereof, and component parts fastened to at least one side surface of the conveyor rail by fastening members placed in the T-groove formed in the same side surface of the conveyor rail.

4 Claims, 4 Drawing Sheets

Fig. 1
PRIOR ART
Fig. 2
PRIOR ART
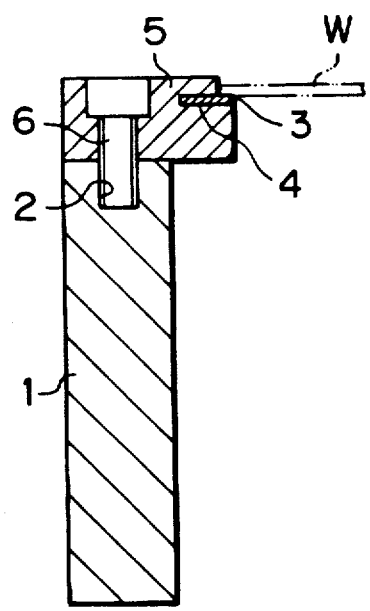
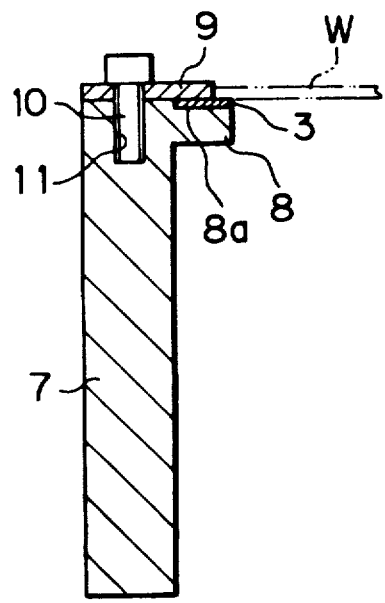

CONVEYOR HAVING GROOVED CONVEYOR RAILS

BACKGROUND OF THE INVENTION

1. Field of the Invention

The present invention relates to a conveyor and, more specifically, to a belt conveyor for conveying individual articles, such as printed circuit boards.

2. Description of the Prior Art

A conveyor incorporated into a production line for mounting electronic parts on printed circuit boards (hereinafter abbreviated as "PCBs") supports each PCB at the opposite side edge regions of the same with belts to enable electronic parts to be mounted on both of the upper and lower sides of the PCB and to obviate the interference of the belts with the leads of the electronic parts mounted on the PCB.

FIG. 1 shows a conventional conveyor for such a purpose. Referring to FIG. 1, this conventional conveyor has a pair of parallel conveyor rails 1 (only one of them is shown) spaced apart a predetermined distance and provided in their upper surfaces with threaded holes 2 arranged at predetermined intervals. A side rail 5 is fixed to the upper surface of each conveyor rail 1 by inserting bolts 6 through holes formed in the side rail 5 and screwing the bolts 6 in the threaded holes 2. The side rail 5 is provided with a narrow groove 4 in its inner side surface so as to guide the lower surface, the outer side edge and an outer portion of the upper surface of a belt 3 extended between pulleys (not shown) disposed respectively, at the opposite ends of the conveyor rail 1.

FIG. 2 shows another conventional conveyor. Referring to FIG. 2, this conventional conveyor has a pair of conveyor rails 7 each provided integrally with an inward projection 8 from located at the upper end of the same. The inner portion of the upper surface of each projection 8 is recessed to form a step 8a so that a belt 3 is seated on the step 8a with its outer edge and lower surface in contact with the surfaces of the step 8a. A side rail 9 is fixed to the upper end of each guide rail 7, by screwing bolts 10 through holes formed in the side rail 9 in threaded holes 11 formed in the upper surface of the guide rail 7, so as to be in contact with the outer portion of the upper surface of the belt 3 to guide the belt 3.

The belts 3 are guided by the conveyor rails 1 (7) and the side rails 5 (9) to convey workpieces W, i.e., PCBs, supported on the inner portions of the belts 3. However, these conventional conveyors have the following disadvantages.

The arrangement of the conveyor sometimes needs to be changed to deal with a change in the type of workpiece to be conveyed, such as PCBs, or a modification of the production line. In those cases, the position of the side rails 5 (9) on the conveyor rails 1 (7), and the respective positions of the pulleys must be changed. However, such changes cannot easily be achieved and require much time, so that the operation rate of the associated production line is reduced and the changes inevitably involve high costs.

SUMMARY OF THE INVENTION

Accordingly, it is an object of the present invention to provide a conveyor capable of readily dealing with a change in the type of workpiece to be conveyed and a modification of the associated production line.

In one aspect of the present invention, a conveyor comprises: an endless conveyor belt; a pair of conveyor rails supporting and guiding the conveyor belt, at least one of the pair of conveyor rails having an upper surface, opposite side surfaces, and a guide portion for guiding an outer side edge and the lower surface of at least a workpiece conveying portion of the conveyor belt on which workpiece are supported to be conveyed, the upper surface and at least one of the side surfaces being provided with respective longitudinal T-grooves having a cross section resembling the letter T; fastening means respectively slidably placed in the T-grooves; a side rail fastened to the upper surface of the conveyor rail by the fastening means so as to guide the upper surface of the work conveying portion of the conveyor belt near the outer side edge thereof; and component parts fastened to at least one side surface of the conveyor rail by the fastening means placed in the T-groove formed in the same side surface.

Since the side rail and the parts can be disposed respectively at desired positions by changing the positions of the fastening means in the T-grooves, the arrangement of the component parts of the conveyor can readily be changed to meet required process conditions.

BRIEF DESCRIPTION OF THE DRAWINGS

The above and other objects, features and advantages of the present invention will become more apparent from the following description taken in connection with the accompanying drawings, in which:

FIG. 1 is a cross-sectional view of an essential side portion of a conventional conveyor;

FIG. 2 is a cross-sectional view of another essential side portion of a conventional conveyor.

DETAILED DESCRIPTION OF THE PREFERRED EMBODIMENT

Figure 3:
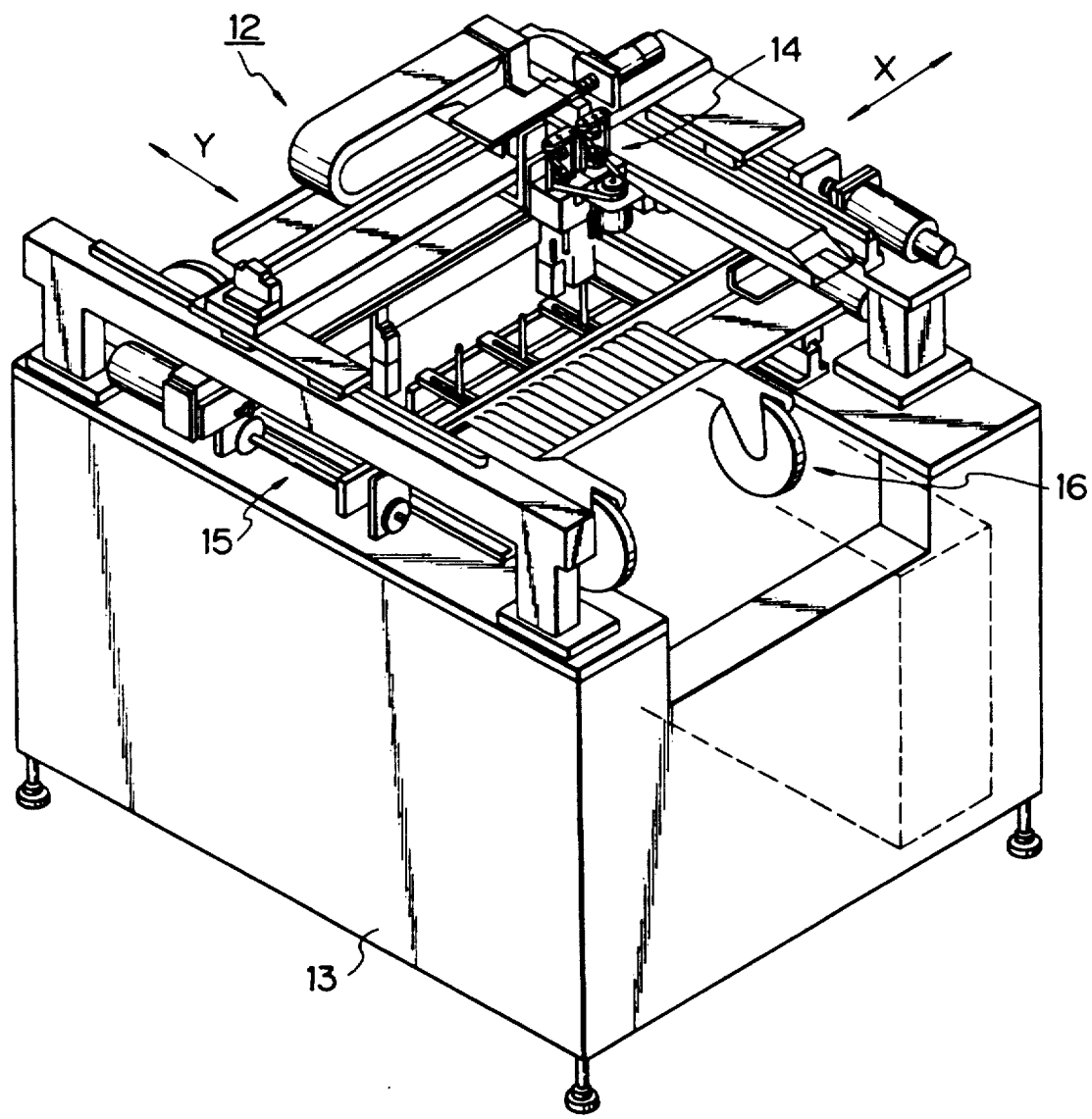
FIG. 3 is a perspective view of an assembling apparatus incorporating a preferred embodiment of a conveyor according to the present invention.

Shown in FIG. 3 is a assembling apparatus 12 incorporating a conveyor of a preferred embodiment according to the present invention. The assembling apparatus 12 is an automatic semiconductor chip mounting apparatus for mounting semiconductor chips, i.e., electronic parts, on workpieces W, e.g., PCBs. Arranged on a base 13 are a chip mounting head 14 capable of holding a chip by virtue of suction and of moving in directions parallel to the X-axis and the Y-axis, a conveyor 15 for conveying workpieces W in a direction parallel to the X-axis, and a chip feeder of a tape type 16 for feeding chips to the chip mounting head 14. After mounting semiconductor chips on a work W supported on the conveyor 15 by the chip mounting head 14, the work W is delivered to the following process.

Figure 5:
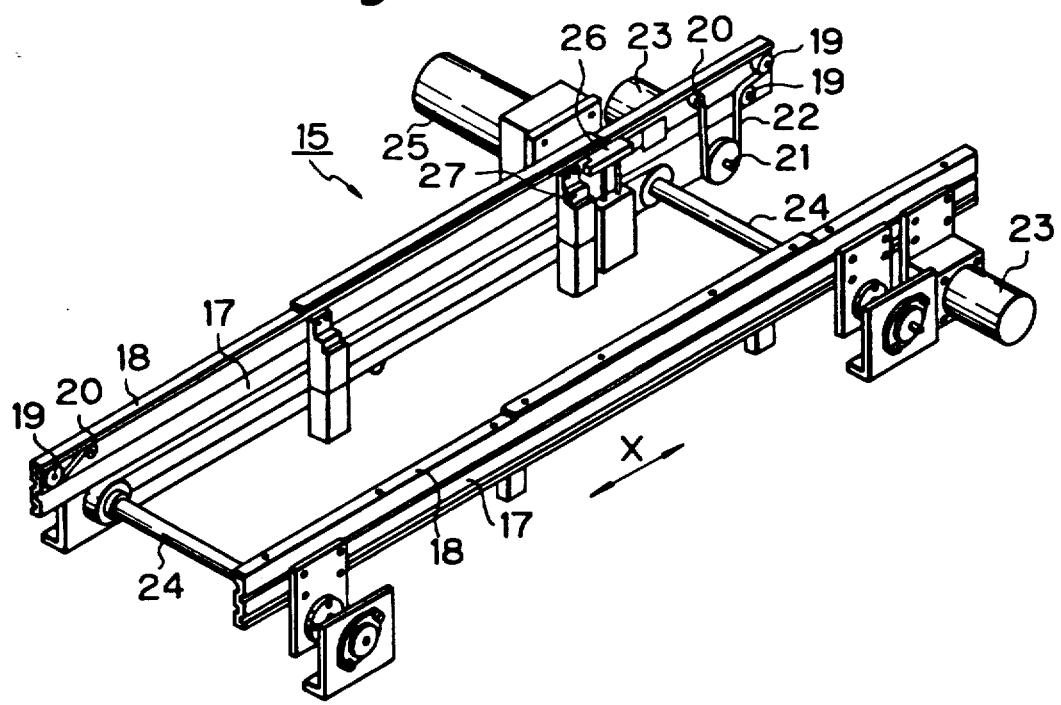
FIG. 5 is a perspective view of the conveyor shown in FIG. 3.

The general construction of the conveyor 15 will be described hereinafter with reference to FIGS. 5 to 7. A pair of parallel conveyor rails 17 extend along the work conveying direction parallel to the X-axis, and side rails 18 are fixed to the upper ends of the conveyor rails 17, respectively. A belt 22 is wound around a driving pulley 21 mounted on the output shaft of a motor 23 and is guided by guide pulleys 19 and 20 supported on the inner side surface of each conveyor rail 17. The motor 23 drives the belt 22 so that the upper side of the belt 22 runs in the work conveying direction. The pair of conveyor rails 17 are connected by feed screws 24. The distance between the conveyor rails 17 can be adjusted to a desired value by rotating the feed screws 24 by a motor 25. A stop 26 for stopping the workpiece W at a predetermined position and sensors 27 for detecting the position of the workpiece W are attached to the conveyor rails 17.

Figure 4:
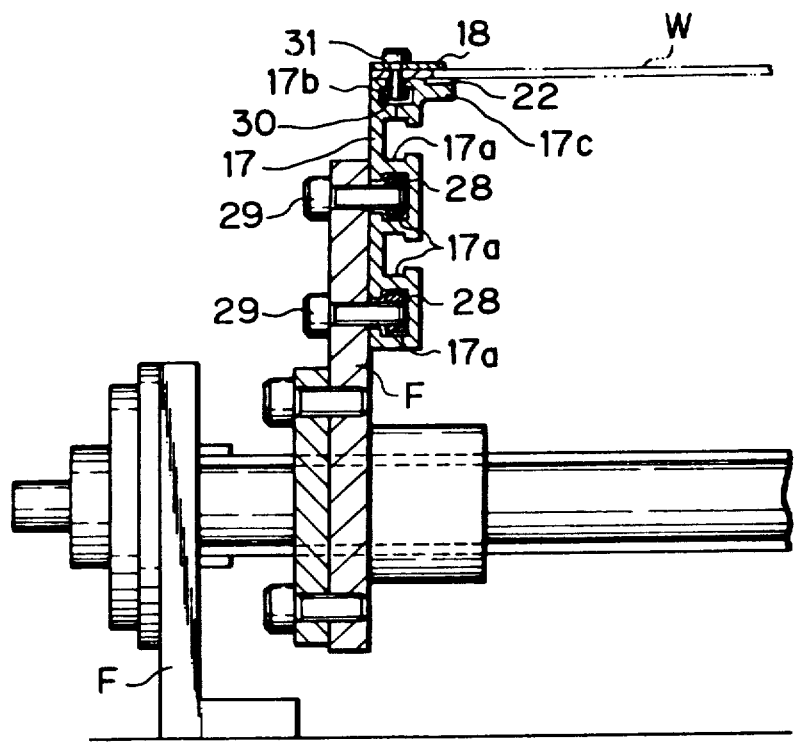
FIG. 4 is an end, partially in section, view of an essential portion of the conveyor shown in FIG. 3.
Figure 6:
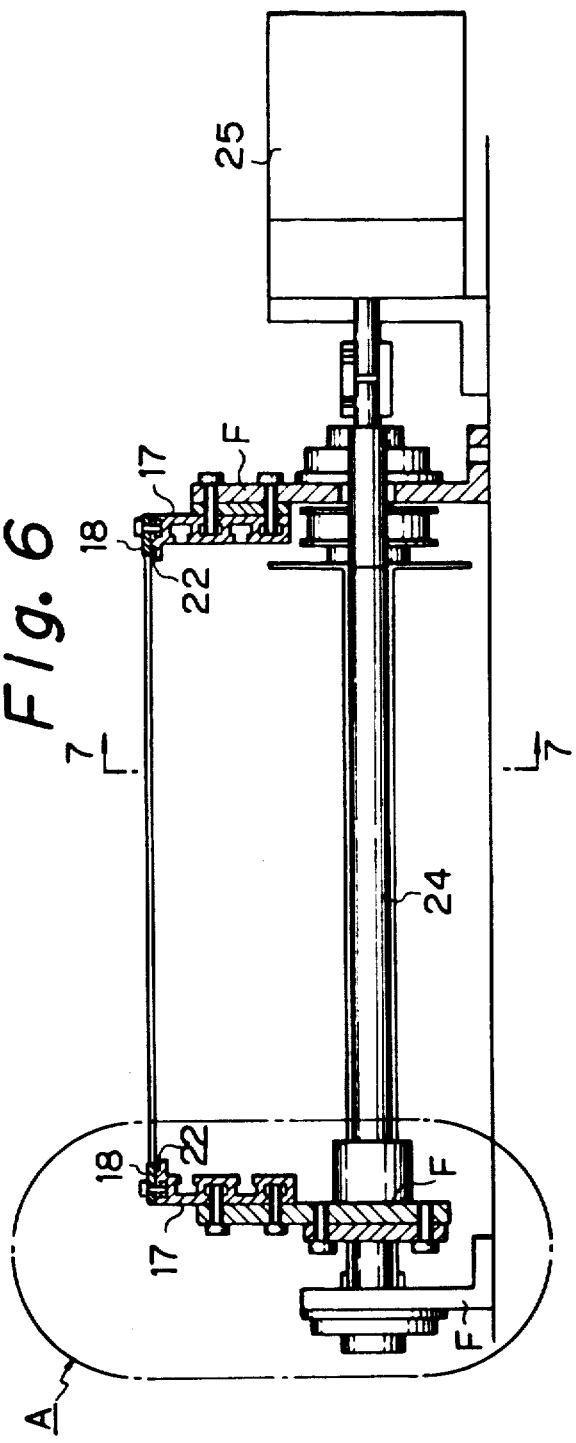
FIG. 6 is a partial cross-sectional view of the conveyor of FIG. 3.
Figure 7:
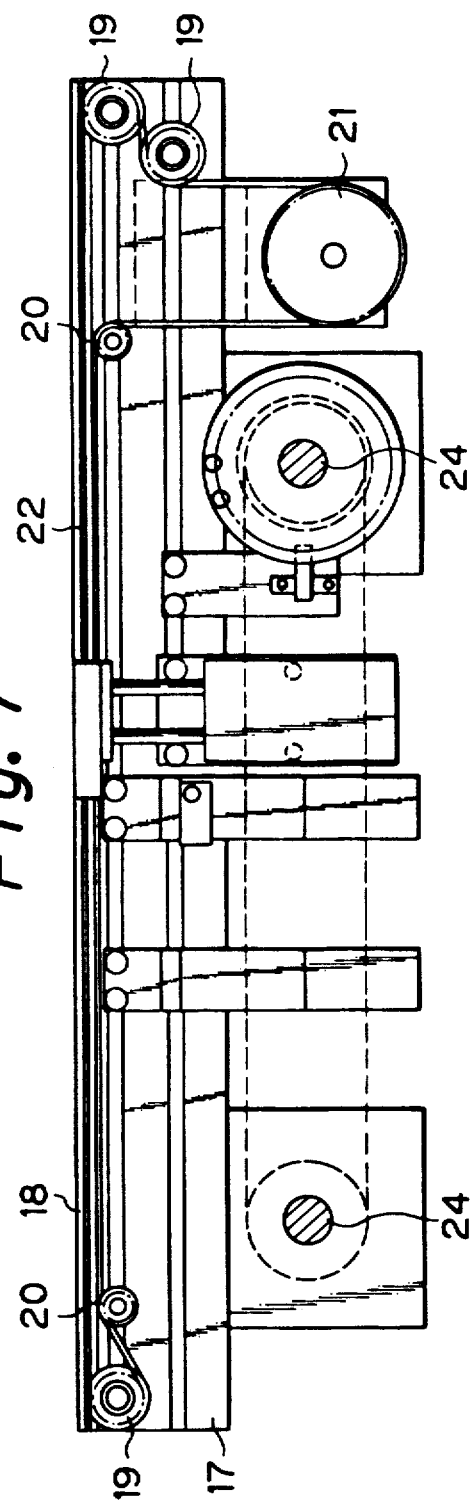
FIG. 7 is a sectional view taken on line 7—7 in FIG. 6.

FIG. 4 shows one of the pair of conveyor rails 17 located on the left side A of the conveyor in FIG. 6 and incorporating an essential portion of the present invention. Longitudinal T-grooves 17a are formed one over another and alternately in the opposite side surfaces of the conveyor rail 17 in a zigzag arrangement, and a longitudinal T-groove 17b is formed in the upper surface of the conveyor rail 17. The conveyor rail 17 is formed of a light metal, such as an aluminum alloy, by extrusion molding. The T-grooves 17a formed in the opposite side surfaces of the conveyor rail 17 are used for fixedly supporting the component parts of the conveyor 15 including the guide pulleys 19 and 20, the motor 21 for driving the belt 22, the stop 26 and the sensor 27 for detecting the position of the workpiece W on the conveyor rail 17, and for securing the conveyor rail 17 to a support member F for supporting the conveyor rail 17 on the upper surface of the base 13. In fastening the conveyor rail 17 to the support member F, square nuts 28 having a diametrical dimension between flats thereof slightly smaller than the width of the T-groove 17a are inserted in the T-groove 17a from one end of the conveyor rail 17, and bolts 29 are screwed through the conveyor rail 17 in the square nuts 28 to fasten the conveyor rail 17 to the support member F as shown in FIG. 4. The component parts are likewise fastened to the conveyor rail 17. Since the square nuts 28 are able to slide longitudinally along the T-grooves 17a and are unable to turn within the T-grooves 17a, the square nuts 28 can readily be positioned at desired locations to attach the component parts correctly at predetermined positions on the conveyor rail 17, and the conveyor rail 17 can correctly be fastened to the support member F.

The conveyor rail 17 is provided integrally with an inner projection inwardly 17c projecting from the upper end of the conveyor rail 17. The lower surface and outer edge of the belt 22 are guided by the projection 17c. In fastening the side rail 18 to the upper surface of the conveyor rail 17, square nuts 30 having a diametrical dimension between flats thereof slightly smaller than the width of the T-groove 17b are inserted in the T-groove 17b from one end of the conveyor rail 17, and then bolts 31 are screwed through the side rail 18 into the square nuts 30 at predetermined positions. The side rail 18 is contiguous with the outer portion of the upper surface of the belt 22. Thus, the projection 17c and the side rail 18 form a guide groove for guiding the belt 22 while traveling. The other conveyor rail 17 and the associated side rail 18 are assembled in the same manner. The workpieces W are seated on the exposed inner portions of the upper surfaces of the belts 22 with the opposite side edges in sliding contact with the side rails 18.

It is to be noted that the length of the conveyor 15 can be easily changed by connecting an additional conveyor rail element having a desired length to each existing conveyor rail 17.

When the work conveying distance of the conveyor 15 needs to be changed according to a change in the arrangement of the assembling apparatus 12, the longitudinal positions of the side rails 18 may also need to be changed. Such changes can readily be effected by loosening the bolts 31, moving the square nuts 30 in the T-grooves 17b to appropriate positions together with the side rails 18 and the bolts 31 and fastening the bolts 31. The positions of the component parts including the guide pulleys 19 and 20, the driving pulleys 21, the stop 26 and the sensors 27 can, if required, also readily be changed likewise by moving the square nuts 28 in the T-grooves 17a to appropriate positions together with the corresponding component parts and the bolts 29.

Thus, the work conveying distance of the conveyor 15 can quickly be changed when required according to a change in the arrangement of the assembling apparatus 12 without requiring much time and labor and without reducing the operation rate of the assembling apparatus 12.

The conveyor rails 17 can be formed in desired lengths by extrusion molding and the conveyor rails 17 of appropriate lengths can easily be joined end-to-end to form a work conveying path of a desired length.

Although, in this embodiment, the square nuts 28 and 30 are placed respectively in the T-grooves 17a and 17b, and the bolts 29 and 31 are screwed in the square nuts 28 and 30 to fasten the component parts including the side rails 18, the guide pulleys 19 and 20 and the driving pulleys 21 to the conveyor rails 17, it is also possible to place the heads of square bolts in the T-grooves 17a and 17b and to screw nuts onto the square bolts in fastening the component parts to the conveyor rails 17. The fastening means for fastening the component parts to the conveyor rails 17 need not be limited to the square nuts 28 and 30 and the bolts 29 and 31; any suitable means capable of sliding within the T-grooves 17a and 17b and of fastening the component parts at desired positions to the conveyor rails 17 may be employed.

The T-grooves 17a need not necessarily be formed alternately on the opposite sides of the conveyor rails 17 in an zigzag arrangement, but may be formed in any desired arrangement in the opposite sides of the conveyor rails 17.

As is apparent from the foregoing description, the conveyor rail of in the conveyor of the present invention is provided with the longitudinal T-grooves in its upper and side surfaces for slidably receiving the fastening means for fastening the component parts of the conveyor including the side rails, so that the arrangement of the component parts can quickly be changed to deal with a change in the work conveying distance of the conveyor without requiring much time and labor and without reducing the operation rate of the associated production line.

Furthermore, the conveyor rails provided with the T-grooves on the opposite sides thereof can be formed from a relatively small amount of material so as to be lightweight and can have a sufficient strength.

Although the invention has been described in its preferred form with a certain degree of particularity, obviously many changes and variations are possible therein.

It is therefore to be understood that the present invention may be practiced otherwise than as specifically described herein without departing from the scope and spirit thereof.

What is claimed is:

1. A conveyor comprising:

endless conveyor belt means for supporting an article and conveying the article in a work conveying direction in the conveyor, said endless conveyor belt means having opposite outer side edges and a lower surface;

a pair of conveyor rails extending longitudinally in the work conveying direction of the conveyor and spaced from one another in a direction transverse to the work conveying direction, each of said conveyor rails having an uppermost surface, inner and outer side surfaces, and a guide portion guiding both a respective one of the side edges of said conveyor belt means and a portion of the lower surface of said conveyor belt means, the inner side surfaces of the conveyor rails facing each other in the conveyor, and each of said guide rails defining T-grooves therein open at said uppermost and at said inner and outer side surfaces thereof, respectively, each of said T-grooves extending in the longitudinal direction of the conveyor rails and having a T-shaped cross section as taken in said direction transverse to the work conveying direction of the conveyor;

a base member;

support means for supporting the conveyor rails on said base member;

side rails respective releasably fastened to said conveyor rails at the upper surfaces of said conveyor rails;

drive means operatively connected to said endless conveyor belt means for driving said endless conveyor belt means in the work conveying direction of the conveyor, said drive means including component parts releasably fastened to said conveyor rails at the inner side surfaces thereof; and fastening means for releasably fastening said support means, said side rails and said component parts relative to said conveyor rails, said fastening means including fasteners extending into the respective T-grooves in the uppermost and inner and outer side surfaces of said conveyor rails, said fasteners being tightenable and loosenable, the fasteners extending into the T-grooves open at the uppermost surfaces of the conveyor rails releasably fastening said side rails to said conveyor rails, the fasteners extending into the T-grooves open at the inner side surfaces of said conveyor rails releasably fastening said component parts of the drive means to said conveyor rails, and the fasteners extending into the T-grooves open at the outer side surfaces of said conveyor rails releasably fastening said conveyor rails to said support means, said fasteners being slidable relative to said conveyor rails within said T-grooves when said fasteners are loosened such that said side rails and said component parts are repositionable relative to said conveyor rails and said conveyor rails are repositionable relative to said support means.

2. A conveyor as claimed in claim 1, wherein the T-grooves open at the side surfaces of each of said conveyor rails are alternately provided at said inner and said outer side surfaces as taken in a direction between the uppermost and bottommost surfaces of each of said conveyor rails.

3. A conveyor as claimed in claim 1, wherein each of said fasteners is a nut threaded to a bolt, each said nut being disposed in the wider section of a respective one of said T-grooves, being non-rotatable in the respective one of said T-grooves and being slidable relative to the conveyor rail in which the respective one of the T-grooves is defined.

4. A conveyor as claimed in claim 1, wherein said endless conveyor belt means includes a pair of endless belts supported on and guided by said conveyor rails, respectively, and said drive means drives said belts in synchronism.

* * * * *